H. RICCI.
CANDY CUTTING MACHINE.
APPLICATION FILED AUG. 18, 1921.
1,433,910.
Patented Oct. 31, 1922.
3 SHEETS—SHEET 2.
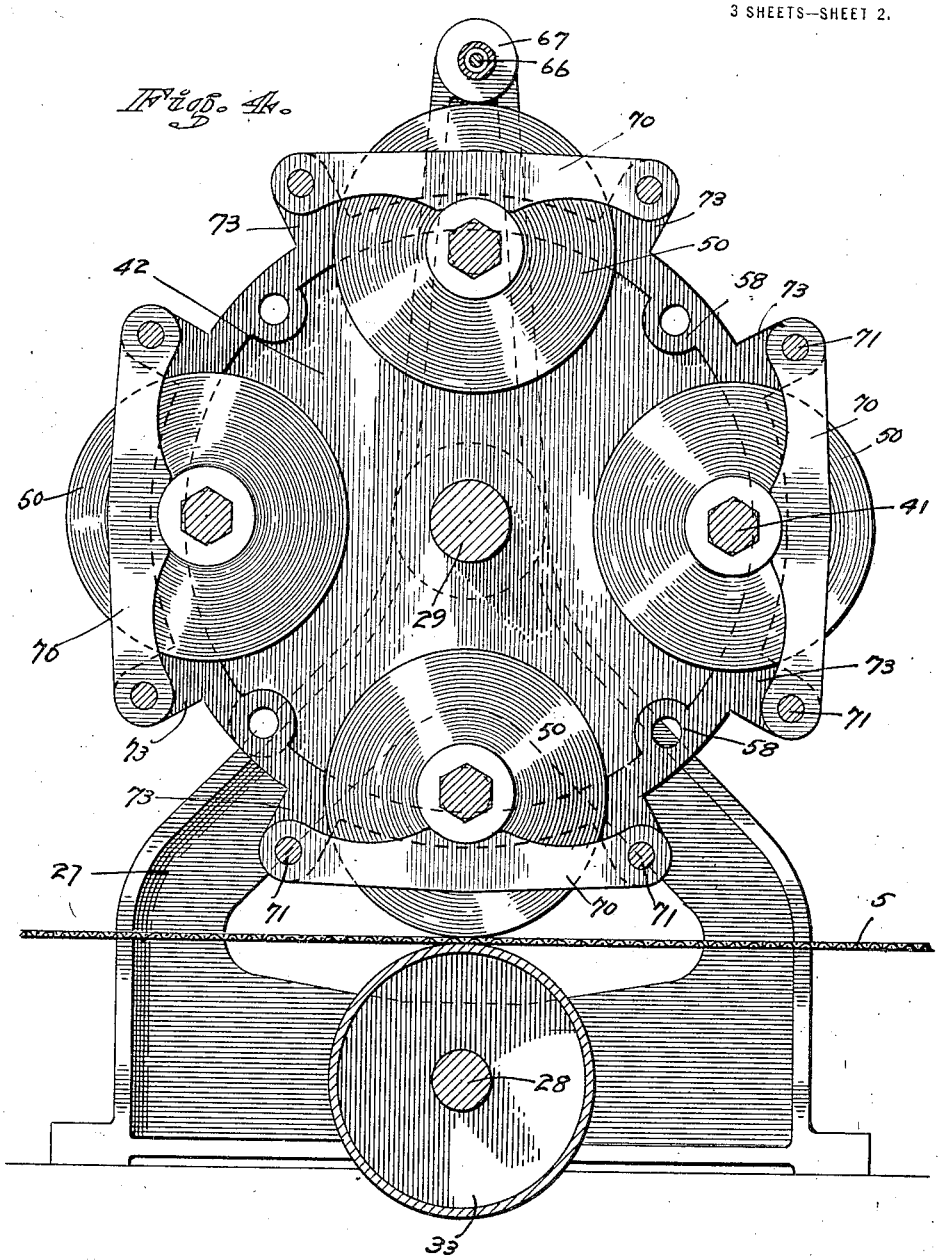
INVENTOR
H. RICCI
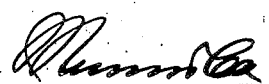
ATTORNEYS.

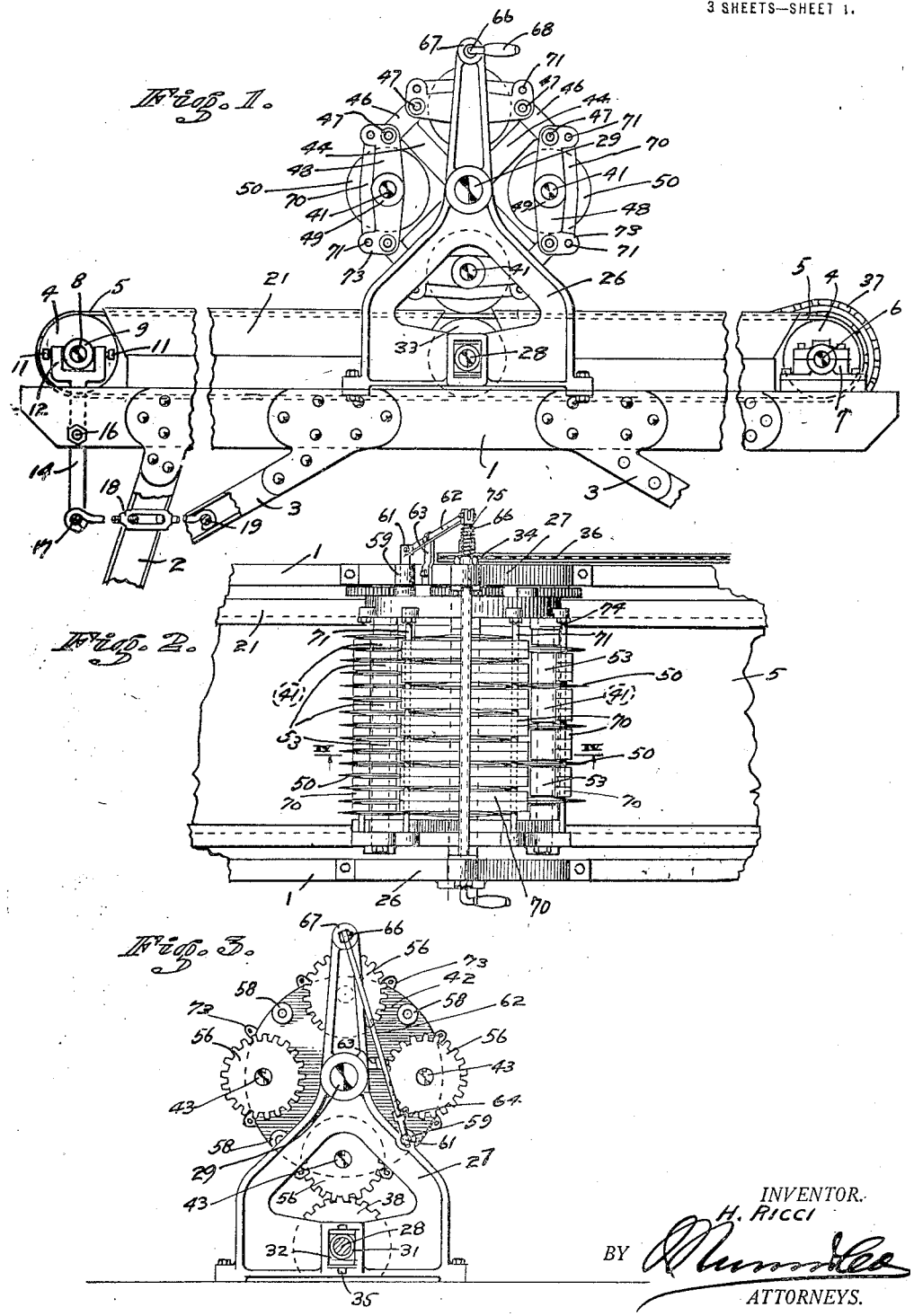

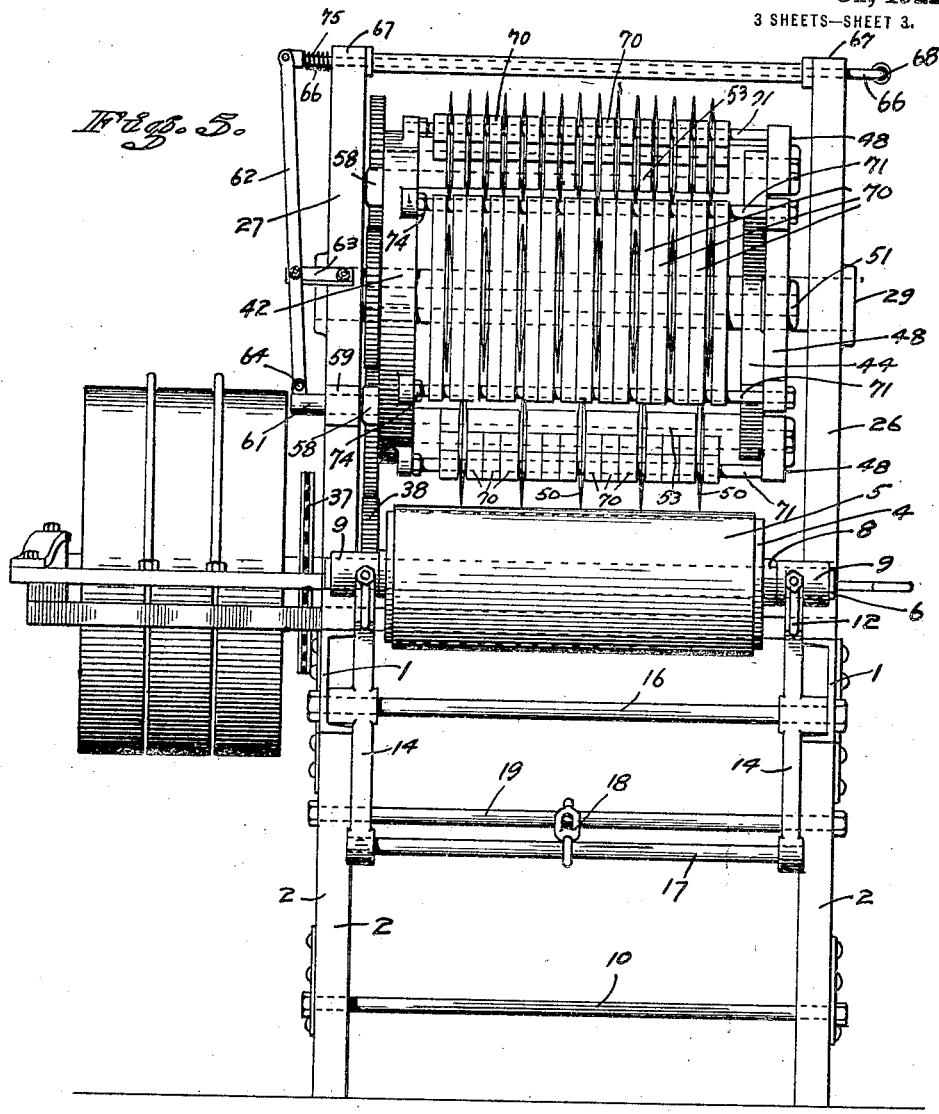

Patented Oct. 31, 1922.

1,433,910

UNITED STATES PATENT OFFICE.

HENRY RICCI, OF SAN FRANCISCO, CALIFORNIA, ASSIGNOR OF ONE-HALF TO BEAUFORD R. CAMP, OF SAN FRANCISCO, CALIFORNIA.

CANDY-CUTTING MACHINE.

Application filed August 18, 1921. Serial No. 493,231.

*To all whom it may concern:*

Be it known that I, HENRY RICCI, a citizen of the United States, and resident of San Francisco, county of San Francisco and State of California, have invented a new and useful Candy-Cutting Machine, of which the following is a specification.

The present invention relates to improvements in candy cutting machines and its particular object is to present a machine of the character described which is adapted to cut a slab of candy into longitudinal slices of a desired width and is provided with a plurality of sets of cutting blades which may be selectively used to secure slices of different width. Candy has been sliced before by a plurality of parallel discs mounted on a revolving shaft, but the particular feature of my device consists in combining a plurality of sets of such discs arranged to cut slices of different widths and secured in such manner that each set may be easily brought into engagement with the driving means for the machine and with the slab of candy to be sliced. A further object of my invention is to provide slicing means securing a clean cut through the candy and preventing the adhering of the candy to the cutting blade and the consequent clogging of the machine.

With these objects in mind I have illustrated the preferred form of my device in the accompanying drawing, in which Figure 1 represents a side view of my device, parts of the supporting frame being broken away, Figure 2 a plan view of the central portion of my device, Figure 3 a side view of said portion as seen from the opposite side to that of Figure 1, Figure 4 a cross-sectional view through the principal working mechanism of the device along line 4—4 of Figure 2, and Figure 5 an end view of the complete device.

Referring to the drawings in detail, it will be noted that the frame of my device comprises two parallel horizontal members (1) resting on the legs (2) and receiving additional support from the braces (3). The two horizontal frame members are secured to each other in any convenient manner, as by the cross-members (10), so as to furnish a firm base for the device to be carried by it. In either end of the frame is supported a transverse shaft (6) and (8) carrying a roller (4), and an endless belt (5), preferably of canvas, is stretched over the two rollers to serve as a moving platform for the slabs of candy to be sliced. One of the shafts, (6), is supported at either end in a bearing (7) rigidly secured to the frame, while the other shaft, (8), is secured at either end in a bearing (9), supported by means of the set screws (11) in the forked end (12) of a lever (14). The two levers (14) are pivotally supported on a transverse shaft (16) resting in the frame, and their free ends are connected by a rod (17), a central portion of which is connected, by the turnbuckle (18), to a transverse shaft (19) secured in the braces (3) as shown in the drawing. By this arrangement the shaft (8) can be moved relative to the shaft (6) through a tightening or loosening of the turnbuckle, and the endless belt can be stretched or slackened without running any risk of disturbing the parallel position of the two shafts (6) and (8) and of thereby causing the belt to slip toward one side. A guide (21) at either side of the endless belt protects the latter from dirt and dust and prevents the clothes of the operator from being caught by the endless belt.

From the central portion of the frame, strengthened by the braces (3), rise two parallel frame structures (26) and (27), one resting on either horizontal frame member. These two structures carry the two main transverse shafts (28) and (29) which are mounted one vertically over the other. The lower shaft, (28), is supported in two bearings (31) slidably secured in rectangular openings (32) of the frame structures (26) and (27) and capable of being slightly adjusted vertically by means of the screws (35). This shaft carries a roller (33) over which the endless belt passes, and provision is made for adjustability in order to enable the operator to exactly determine the height of the canvas relative to the cutting blades mentioned hereinafter so as to prevent the belt from being cut by the blades and at the same time to insure the greatest efficiency in cutting the candy. The shaft (28) is also the one to which power is applied from any suitable source through the pulleys (40). Three pulleys are shown in the drawing, the outer ones being loose pulleys and being provided one with a direct drive belt and the other with a reverse belt. Four prongs (45) control the two belts and allow the operator to slide either one on the central or fixed pulley. The shaft (28) is further provided with a sprocket wheel (34) which, through the chain (36), transmits rotary motion to the sprocket wheel (37) and through the latter to the roller (4) secured to the same shaft, whereby the endless belt is set in motion.

The shaft (28) also carries a gear wheel (38) which drives the cutting portion of my device supported on the upper transverse shaft (29). The cutting portion consists of four sets of blades, each set comprising a shaft (41) on which are mounted a plurality of disc blades (50) in spaced relation and the four shafts are arranged in the corners of a regular polygon of which the shaft (29) is the center. I have selected four sets, because in practical use this number seems to be most convenient, but I wish it to be understood that the number of sets is not essential and that more or less may be selected without affecting the spirit of the invention. These four sets are supported on the shaft (29) as follows:

At one end of the latter shaft, as shown in Figures 3 and 5, a disc (42) is rigidly secured to the same and provided with four holes (43) distributed over the disc so as to define the four corners of a square of which the shaft (29) is the center, which holes serve as bearings for one end of the four shafts (41). The support of the shafts at the other end is shown in Figure 1 and comprises two crosswise arranged bars (44) centrally supported on the shaft (29), each cross bar having a T-beam (46) at either end, and each T-beam having a stud (47) near either end adapted to receive corresponding perforations in connecting links (48) bridging the space between each two adjacent T-beam. The latter links support the other ends of the shafts (41) in centrally disposed bearings (49), which, of course, are arranged to correspond to the bearings in the disc (42), and the links are secured in their places by means of nuts (51), (Figure 5) screwed to the threaded ends of the studs. Thus the links carrying the bearings can be easily and quickly removed, whereby the assembling and the taking apart of the blade carrying shafts is facilitated.

The latter shafts, (41), are, throughout their blade holding portions, of angular cross section, as shown particularly well in Figure 4. The blades, (50), which are disc shaped, are provided with central perforations corresponding to the cross-section of the shafts and held in spaced relation to each other on the shafts by means of blocks (53) having similar perforations interposed between each two of the blades. The blocks used on each shaft will ordinarily be of the same width so that the slices cut simultaneously are alike in width, but the blocks on the different shafts are preferably of different width, the very object of the invention being to provide a quick means for adjusting the device to cut different-sized slices.

Each shaft (41) is provided with a gear wheel (56), each gear wheel being in the same vertical plane with the gear wheel (38) on the shaft (28) and adapted to be brought into engagement with the same by a turn of the shaft (29) or the disc (42) secured thereto.

To lock the latter disc in any of the four operative positions I provide four sleeved projections (58) on the same, each of which is adapted to register with a corresponding sleeve (59) supported in the frame structure (27), when a corresponding gear wheel (56) is in engagement with the gear wheel (38), and to be locked thereto by a pin (61) penetrating both sleeves. The latter pin may be handled directly by the operator, or, if the latter happens to be at the other side of the device, can be handled by means of the lever (62) secured in a bracket (63) extending from the frame structure (27), one end of which is pivotally secured to the pin, as shown at (64), while the other end is operatively connected to a transverse rod (66) supported preferably in bearings (67) in the upper portion of the frame structures (27) and (28) and provided at the opposite side of the machine with a convenient handle (68) and with a return spring (75).

To guide the blades as well as to remove any candy adhering to the same, I provide one or more strips of wood (70) between each two blades, the latter protruding beyond the strips by about the thickness of the slab of candy to be cut, so that the backs of the strips do not touch but are in close proximity to the top of the candy slab and thus prevent the same from being lifted by the cutting action of the blades. The backs of the strips are slightly cambered so as to present a slanting surface to the candy slab. The strips for each set of blades are supported on two transverse rods (71) which extend between the supporting means for the shafts (41). The rods are carried at one end in perforated lugs (72) secured to the rim of the disc (42), and at the other end in perforated lugs (73) secured to the links (48) in corresponding positions. It will be noted that at the disc end the rods are provided with nuts (74) screwed on their threaded ends, which prevent the rods from penetrating the lugs any further than is necessary to gain a substantial hold, while at the other end no securing means is necessary, the links (48) being simply slipped over the rods.

The device described herein above combines the features of several separate devices used heretofore and is a substantial labor saver. To use it, after it has been assembled and set for the proper width of slice to be cut, the operator need only place the slab of candy upon the belt and start the machine. As the slab passes under the lower set of disc blades, it is cut into slices by the blades. After the slab has passed, it may be given a quarter turn, the rotation of the main driving shaft reversed and the slab passed back to be cut into squares. If a different width of cut is desired, the handle (68) is pulled, the shaft (49) turned so as to bring the desired gear wheel (56) into engagement with the gear (38), and the handle returned so as to force the stud (61) into the two corresponding sleeves (58) and (59) to lock the device in that position, whereupon the machine is ready to start. Four different sets being provided, all ordinary cuts can be handled by one machine without any changes. If a width of slice should be desired that is not provided for, a link (48) may be removed and the corresponding shaft can be taken out and the spacing blocks changed. The fact that the shafts (41) are of angular cross-section, essentially strengthens the blade action and at the same time facilitates the exchange of blades.

I claim:

1. A slicing machine of the character described, comprising a frame, an endless belt secured thereon, a transverse shaft supported over the belt, a plurality of sets of rotary cutting blades, means for rotatably and removably securing the sets around the shaft in spaced relation from the same, including cross-arms carrying removable bridging links, means for selectively bringing any one of the sets into operative relation with the belt and means for imparting rotary motion to the said set and longitudinal motion to the belt.

2. A slicing machine of the character described, comprising a frame, an endless belt secured thereon, a transverse central shaft supported over the belt having a disc at one end and a plurality of cross-arms with removable connecting links bridging the points of the same at the other end, a plurality of transverse shafts supported in the disc and the links in circumferential relation to the central shaft, a set of rotary cutting blades rigidly supported on each circumferential shaft in spaced relation, means for selectively bringing any one of the sets into operative relation with the belt and means for imparting rotary motion to the said set and longitudinal motion to the belt.

3. A slicing machine of the character described, comprising a frame, an endless belt secured thereon, a transverse central shaft supported over the belt having a disc at one end and a plurality of cross-arms with removable connecting links bridging the points of the same at the other end, a plurality of transverse shafts supported in the disc and the links in circumferential relation to the central shaft, a set of rotary cutting blades rigidly supported on each circumferential shaft in spaced relation, cambered guards for the blades supported in the disc and the connecting links, means for selectively bringing any one of the sets into operative relation with the belt, and means for imparting rotary motion to the said set and longitudinal motion to the belt.

4. A slicing machine of the character described, comprising a frame, an endless belt secured thereon, a transverse central shaft supported over the belt having a disc at one end and a plurality of cross-arms with removable connecting links bridging the points of the same at the other end, a plurality of transverse shafts of angular cross-section supported in the disc and the links in circumferential relation to the central shaft, a set of rotary cutting blades having corresponding angular central perforations supported on each circumferential shaft in spaced relation, means for selectively bringing any one of the sets into operative relation with the belt, and means for imparting rotary motion to the said set and longitudinal motion to the belt.

5. A slicing machine of the character described, comprising a frame, an endless belt secured thereon, a transverse central shaft supported over the belt having a disc at one end and a plurality of cross-arms with removable connecting links bridging the points of the same at the other end, a plurality of transverse shafts supported in the disc and the links in circumferential relation to the central shaft, a set of rotary cutting blades rigidly supported on each circumferential shaft in spaced relation, a driving gear, a gear wheel on each circumferential shaft adapted to be engaged with the driving gear whereby the blades of the shaft are brought into operative relation with the belt, and means for locking the circumferential shafts relative to the central shaft when the engagement is established.

6. A slicing machine of the character described, comprising a frame, an endless belt secured thereon, a transverse central shaft supported over the belt having a disc at one end and a plurality of cross-arms with removable connecting links bridging the points of the same at the other end, a plurality of transverse shafts supported in the disc and the links in circumferential relation to the central shaft, a set of rotary cutting blades rigidly supported on each circumferential shaft in spaced relation, a driving gear, a gear wheel on each circumferential shaft adapted to be engaged with the driving gear whereby the blades of the shaft are brought into operative relation with the belt, and means for locking the circumferential shafts relative to the central shaft when the engagement is established, said locking means comprising corresponding perforations in the disc and the frame and a bolt adapted to be inserted into the same.

HENRY RICCI.